United States Patent [19]
Maupin

[11] Patent Number: 6,154,832
[45] Date of Patent: Nov. 28, 2000

[54] PROCESSOR EMPLOYING MULTIPLE REGISTER SETS TO ELIMINATE INTERRUPTS

[75] Inventor: Patrick E. Maupin, Austin, Tex.

[73] Assignee: Advanced Micro Devices, Inc., Sunnyvale, Calif.

[21] Appl. No.: 09/205,444

[22] Filed: Dec. 4, 1998

[51] Int. Cl.[7] .................................................... G06F 9/312
[52] U.S. Cl. ........................ 712/228; 712/244; 710/260
[58] Field of Search ................................... 712/228, 224; 710/260

[56] References Cited

U.S. PATENT DOCUMENTS

| | | |
|---|---|---|
| 4,905,190 | 2/1990 | Yokoyama . |
| 5,050,067 | 9/1991 | McLagan et al. . |
| 5,421,014 | 5/1995 | Bucher . |
| 5,515,538 | 5/1996 | Kleiman . |
| 5,546,593 | 8/1996 | Kimura et al. . |
| 5,649,225 | 7/1997 | White et al. . |
| 5,724,565 | 3/1998 | Dubey et al. . |

FOREIGN PATENT DOCUMENTS

| | | |
|---|---|---|
| 0 538 817 A2 | 4/1993 | European Pat. Off. . |

OTHER PUBLICATIONS

Elkateeb et al., "An Evaluation to the Use of the Non–Overlapped Multiple Register Sets in the Network Nodes Processor", *1997 IEEE Pacific Rim Conference on Communications, Computers, and Signal Processing, 1997.10 Years PACRIM 1987–1997–Networking the Pacific Rim*, vol. 2, pp. 887–890.

Elkateeb, "The Impact of Using RISC Architecture in the Network Nodes Processor", *Intelligent Information Systems, IIS '97 Proceedings*, pp. 540–544, 1997.

Hiroaki et al, "An Elementary Processor Architecture With Simultaneous Instruction Issuing From Multiple Threads," Computer Architecture News, vol. 20, No. 2, May 1, 1992, pp. 136–145.

"Register Banking for IBM System/370," IBM Technical Disclosure Bulletin, vol. 34, No. 4B, Sep. 1, 1991, pp. 372–373.

Byrd et al, "Multithreaded Processor Architectures," vol. 32, No. 8, Aug. 1995, New York US, pp. 38–46.

Intel Corp., "MultiProcessor Specification," Version 1.1, Apr. 1994, pp. 1,1–Glossary 2.

Hummel, "PC Magazine Programmer's Technical Reference: the Processor and Coprocessor", 1992, pp. 153–182.

Intel Corp., "Microprocessor & Peripheral Handbook—Vol. I Microprocessor," 1989, pp. 2–259 through 2–277.

Singh, et al., "16–Bit and 32–Bit Microprocessors Architecture, Software, and Interfacing Techniques," 1991, pp. 302–305.

*Primary Examiner*—William M. Treat
*Attorney, Agent, or Firm*—Conley, Rose & Tayon, PC; Lawrence J. Merkel

[57] ABSTRACT

A processor includes multiple register sets. A different register set may be dedicated to each of one or more interrupt sources, and yet another register set may be dedicated to other (non-interrupt) tasks. The interrupt sources may record interrupt service requests instead of signalling an interrupt to the processor. Periodically, the processor may poll the interrupt sources to determine if a service request is recorded.

22 Claims, 5 Drawing Sheets

PROCESSOR EMPLOYING MULTIPLE REGISTER SETS TO ELIMINATE INTERRUPTS

BACKGROUND OF THE INVENTION

1. Field of the Invention

This invention is related to the field of processors and embedded controllers and, more particularly, to interrupt mechanisms within processors and embedded controllers.

2. Description of the Related Art

Processors are generally used to execute instruction sequences designed to perform a desired operation in a computer system. The instruction sequence as well as associated processor and system state is referred to herein as a "task". General purpose processors are frequently used as the central processing unit of general purpose computer systems. Additionally, processors are integrated with various types of peripheral logic to form embedded controllers. These controllers may be used to perform computing functions in non-general purpose computer environments (e.g. disk drive controllers, cellular phones, personal digital assistants, electronic control systems used in non-electronic environments such as automobiles, etc.).

Processors are further used, in addition to executing tasks, to provide interrupt services to other devices coupled to the processor (either integrated into embedded controller with the processor, or coupled to the processor in either a general purpose environment or an embedded controller environment). Generally, the interrupt services are requested when the hardware employed within these other devices determines that a situation exists which the hardware itself is not configured to handle. For example, a device may include a buffer for storing data which is to be transferred to another device within the computer system (e.g. a memory). If the buffer becomes full, the device may need service from the processor to empty the buffer. By using the processing power within the processor, the hardware employed within these devices may be simplified (since the hardware need not handle the situation) and separate processors need not be included within the devices to provide the instruction execution resources needed to provide the service.

Typically, devices inform processors of the need for service by asserting an interrupt signal to the processor. In response to the interrupt signal, the processor suspends execution of the current task to execute an interrupt service routine. The instructions within the interrupt service routine cause the processor to communicate with the device needing the service (the "interrupt source"). By executing the interrupt service routine, the processor determines the service needed by the device and performs the service. Subsequently, the processor resumes execution of the interrupted task.

Unfortunately, implementing interrupts in a processor is a complicated matter. Because the purpose of the interrupt may have nothing to do with the interrupted task, the interrupt service routine generally executes transparently to the interrupted task. Several features of performing an interrupt help to ensure the transparency of the interrupt. First, the task is suspended at a particular point within the instruction sequence. Each instruction prior to the particular point has completed execution, and none of the instructions subsequent to the particular point have executed. Second, the "context" (e.g. processor state including register values used by the task) is stored for restoration after the interrupt service routine is executed (e.g. typically stored in a context save area reserved by the operating system within memory). Responsibility for correctly saving and restoring the context may be assigned to hardware (e.g. processor hardware invoked when the interrupt is signalled) or software (e.g. the interrupt service routine).

Both of the aforementioned interrupt features may be complicated to implement and/or may impact performance of the processor. Suspension of the currently executing task is complicated by the fact that the interrupt may be signaled at any arbitrary point during execution of the task. Modern processors are often configured with complex instruction processing pipelines and/or multiple instruction processing pipelines. Correctly suspending the instruction sequence (such that a point can be defined within the instruction sequence for which each instruction prior to that point has completed execution and each instruction subsequent to that point has not executed) may be highly complicated. Furthermore, verifying that arbitrary interrupt may occur and that the executing task may be correctly suspended is difficult.

While successfully saving and restoring the state of the processor may be less complicated to implement than correctly suspending the task, saving and restoring state may be a time-consuming activity which may impact overall execution performance. Accordingly, a method for providing services typically requested by signalling interrupts to the processor is desired.

SUMMARY OF THE INVENTION

The problems outlined above are in large part solved by a processor and one or more interrupt sources in accordance with the present disclosure. The processor includes multiple register sets. A different register set may be dedicated to each interrupt source, and yet another register set may be dedicated to other (non-interrupt) tasks. Accordingly, context save and restore operations in the service routines corresponding to the interrupt sources may be reduced or eliminated. Overall processor performance may be improved due to a reduction in the amount of time elapsing during execution of service routines.

The interrupt sources may record interrupt service requests instead of signalling an interrupt to the processor. Periodically, the processor may poll the interrupt sources to determine if a service request is recorded. Accordingly, hardware for supporting an arbitrary interruption of a code sequence may be reduced or eliminated. The corresponding complexities and verification difficulties may thereby be avoided.

Broadly speaking, a processor is contemplated. The processor comprises an execution core configured to execute instructions and a register file coupled to the execution core. The register file is divided into a plurality of register sets. One of the plurality of register sets is dedicated to a default task, and each remaining one of the plurality of register sets is dedicated to a different interrupt source.

Additionally, an embedded controller is contemplated. The embedded controller comprises a processor and one or more interrupt sources coupled to the processor. The processor includes an execution core configured to execute instructions and a register file coupled to the execution core. The register file is divided into a plurality of register sets. One of the plurality of register sets is dedicated to a default task, and each remaining one of the plurality of register sets is dedicated to a different interrupt source.

Moreover, a method for servicing an interrupt source is contemplated. A request for service is recorded in a service request register. The service request register is polled, thereby detecting the recording of the request for service. A service routine is executed if the polling detects the request. Executing the service routine comprises accessing a set of registers dedicated to the interrupt source.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
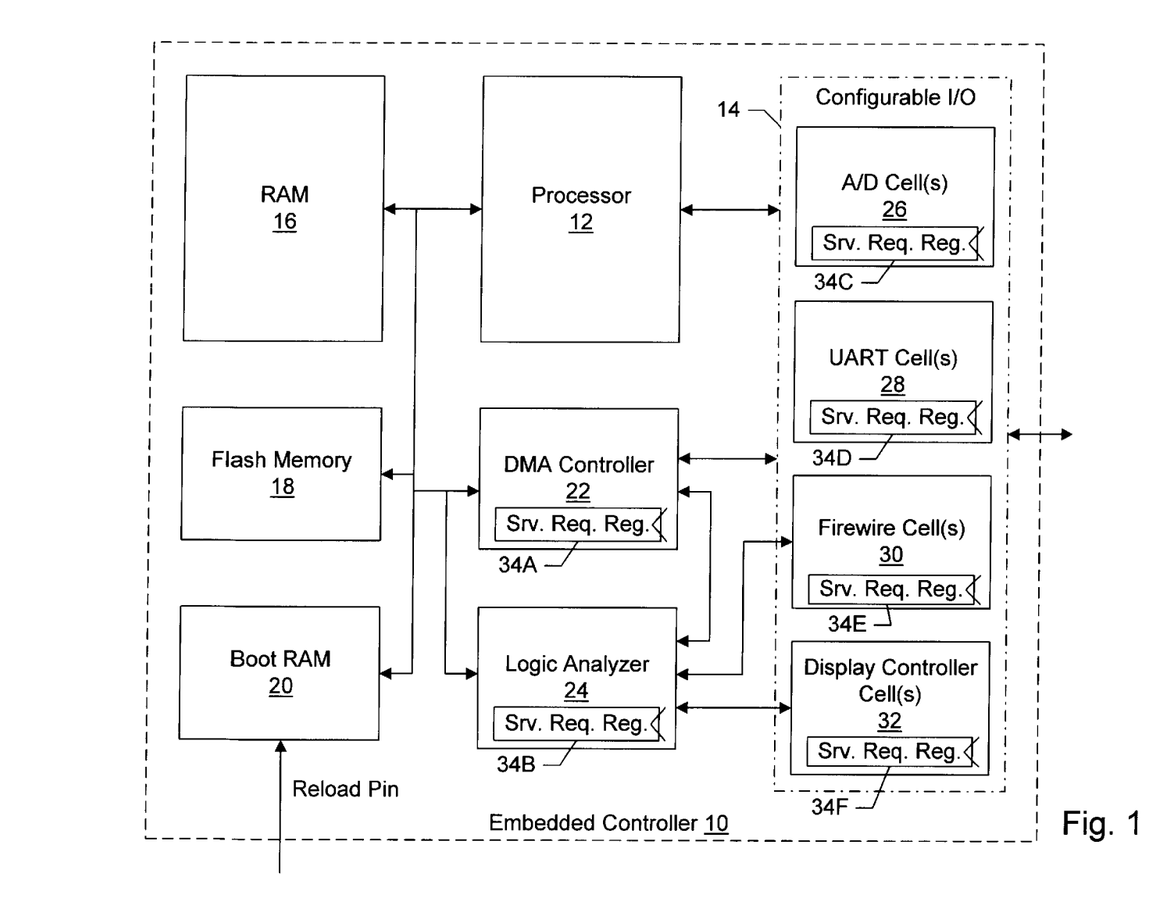
FIG. 1 is a block diagram of one embodiment of an embedded controller.

Turning now to FIG. 1, a block diagram of one embodiment of an embedded controller 10 is shown. Other embodiments are possible and contemplated. In the embodiment of FIG. 1, controller 10 includes a processor 12 coupled to a configurable I/O block 14, a RAM 16, a flash memory 18, a boot RAM 20, a DMA controller 22, and a logic analyzer 24. Each of DMA controller 22, logic analyzer 24, boot RAM 20, flash memory 18, and RAM 16 are coupled as shown in FIG. 1. Additionally, DMA controller 22 is coupled to configurable I/O block 14. Configurable I/O block 14 includes, in the present embodiment, a variety of input/output cells. For example, configurable I/O block 14 may include analog/digital (A/D) cell 26, universal asynchronous receiver/transceiver (UART) cell 28, firewire cell 30, and display controller cell 32. Each of cells 26–32 may comprise multiple cells as desired. Firewire cell 30 and display controller cell 32 are both coupled to logic analyzer 24 in the present embodiment. Furthermore, configurable I/O block 14 is coupled to variety of input/output pins for communicating externally to embedded controller 10. Each of the DMA controller 22, logic analyzer 24, A/D cell 26, UART cell 28, firewire cell 30, and display controller cell 32 includes a service request register respectively numbered 34A–34F.

Processor 12 is generally configured execute instructions according to tasks which may be stored in RAM 16, flash memory 18, and/or boot RAM 20. In response to executing the instructions, processor 12 may operate upon data stored in RAM 16, flash memory 18, boot RAM 20, and/or configurable I/O block 14. A variety of the devices shown in FIG. 1 may rely upon processor 12 for software services which would typically be requested using one or more interrupt signals to processor 12. However, in the present embodiment, interrupt signals are not provided. Instead, each device which relies upon processor 12 for service (an interrupt source) includes a service request register 34A–34F. When a device determines that it particular service is needed, that device records the service request in the corresponding service request register 34A–34F. Meanwhile, processor 12 may continue executing a task without interruption.

Processor 12 periodically polls the service request registers 34A–34F in order to determine which devices are requesting service. A task corresponding to each device which is requesting service is scheduled for execution upon polling a service request from that device. The tasks are then executed according to the schedule, and hence each device receives the requested service. By eliminating interrupt signals from processor 12, the design and verification of processor 12 may be simplified. As used herein, the term "poll" refers to a periodic read operation to determine a value stored in a storage location without modifying that storage location.

Processor 12 may additionally be configured with a variety of register sets within its register file. A different register set may be permanently assigned (or "dedicated") to tasks corresponding to each of the interrupt sources within embedded controller 10. Furthermore, a register set may be dedicated to one or more interrupt sources external to embedded controller 10. Finally, a register set may be dedicated to the default task or tasks which may be executed by processor 12. Because separate register sets are assigned to each task, context save and restore operations may be eliminated. Overall performance of processor 12 may be increased due to the reduced or eliminated need for context save and restore operations.

RAM 16 comprises a set of random access memory locations addressable by processor 12. RAM 16 may store instructions and/or data for manipulation by processor 12. Any suitable sized memory may be used. Flash memory 18 comprises a set of flash memory locations addressable by processor 12. Boot RAM 20 comprises a set of random access memory locations addressable by processor 12 as well. Boot RAM 20 may be used to store a set of instruction sequences used to initialize embedded controller 10 and/or a system into which embedded controller 10 is included.

DMA controller 22 includes one or more DMA channels for transferring data from configurable I/O block 14 to one or more of RAM 16, flash memory 18, and boot RAM 20 (or vice versa). Additionally, the DMA channels may transfer data between blocks of memory. Processor 12 may communicate with DMA controller 22 to configure the DMA channels. DMA controller 22 includes service request register 34A, through which DMA controller 22 records service requests. For example, DMA controller 22 may record a service request corresponding to each channel when the channel completes its current DMA transfer. In this manner, processor 12 may be informed upon completion of the DMA transfer. Processor 12 may then determine that the target memory locations of the DMA transfer are valid with the transferred data and may also determine that the channel is free for performing another DMA.

Logic analyzer 24 may be configured to provide logic analyzer-type outputs (e.g. signal values at various clock edges) for the firewire bus external to embedded controller 10 to which firewire cell 30 is coupled, the display controller bus external to embedded controller 10 to which display controller cell 32 is coupled, and the processor bus to which RAM 16, flash memory 18, boot RAM 20, DMA controller 22, and logic analyzer 24 are coupled. Logic analyzer 24 may rely upon processor 12 for a variety of services, requests for which are recorded in service request register 34B.

A/D cell 26 may be configured to convert analog inputs to embedded controller 10 from external sources to digital format for use within embedded controller 10. A/D cell 26 may include a buffer for storing digitized values, and may rely on processor 12 to read the digitized values from the buffer and store them into a memory (e.g. RAM 16). A/D cell 26 may record a request to read the buffer in service request register 34C, for example.

UART cell 28 may be configured to provide asynchronous communication with devices external to embedded controller 10. UART cell 28 may include, for example, transmit and receive FIFOs for providing the asynchronous communication. When either FIFO exceeds a predetermined threshold of fullness or emptiness, UART cell 28 may record a request for service in service request register 34D to have the FIFO emptied or filled by processor 12 to/from memory.

Firewire cell 30 is configured to couple to a firewire bus in conformance with the IEEE 1394 specification. A variety of services may be provided by processor 12 for firewire cell 30 to support the 1394 specification. Requests for the services are recorded in service request register 34E.

Display controller cell 32 is configured to couple to a display controller bus for communication with a display. Again, one or more services may be provided by processor 12 to support display controller cell 32's communication with a display. Requests for these services may be recorded in service request register 34F.

Service request registers 34A–34F may indicate requests for service using any suitable encoding. For example, a bit may be assigned to each possible service requested by a particular interrupt source. An interrupt service routine (which may comprise the task corresponding to each interrupt source) includes instructions which examine the value stored in the corresponding service request register to determine the service being requested. Generally, each service request register 34A–34F may use a different encoding, format, etc., as may be desired according to design choice.

Figure 2:
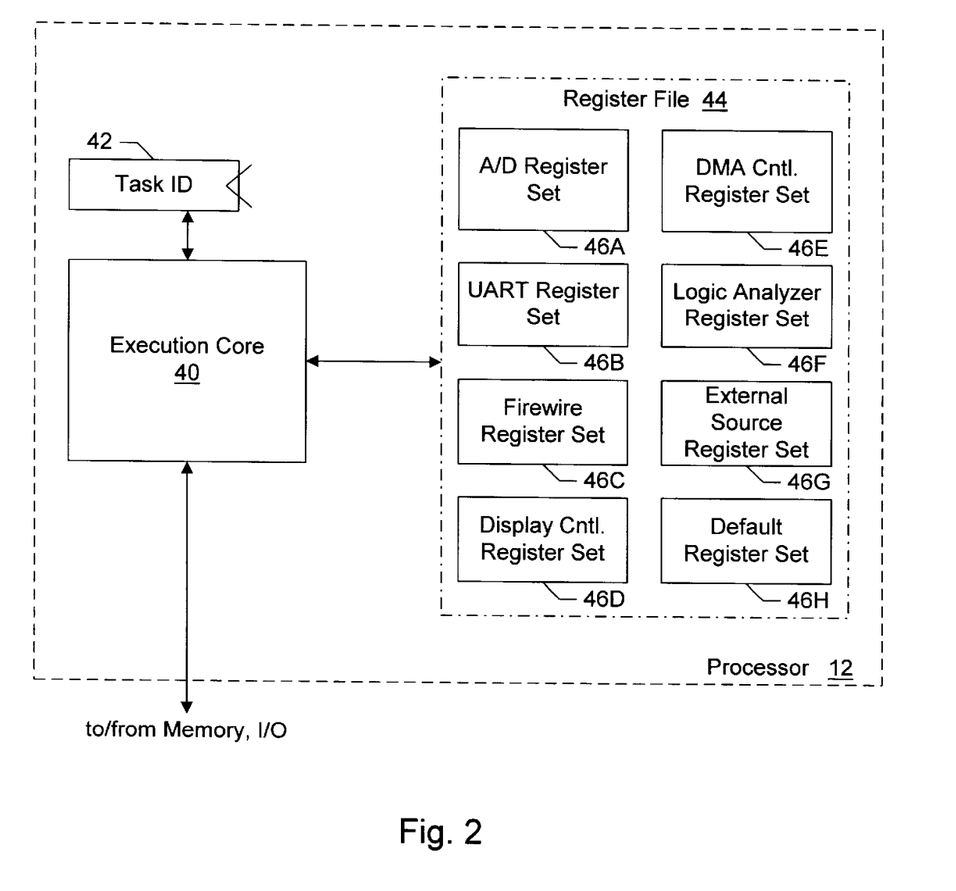
FIG. 2 is a block diagram of one embodiment of a processor included within the embedded controller shown in FIG. 1.

Turning next to FIG. 2, a block diagram of one embodiment of processor 12 is shown. Other embodiments are possible and contemplated. In the embodiment FIG. 2, processor 12 includes execution core 40, a task ID register 42, and a register file 44. Execution core 40 is coupled to task ID register 42, register file 44, and memory and I/O portions of embedded controller 10. Although described in the present disclosure as a portion embedded controller 10, processor 12 may be employed in other environments as well. For example, processor 12 may be employed as a general-purpose processor in a computer system.

Register file 44 includes multiple register sets 46A–46H. Each register set 46A–46H is dedicated to a particular task. In other words, the register set is permanently assigned to the particular task. For example, register set 46A is assigned to A/D cell 26. Similarly, register set 46B is assigned to UART cell 28; register set 46C is assigned to firewire cell 30; register set 46D is assigned to display controller cell 32; register set 46E is assigned to DMA controller 22; register set 46F is assigned to logic analyzer 24; register set 46G is assigned to one or more external interrupt sources (wherein the external interrupt sources are external to embedded controller 10); and register set 46H is assigned to a default task (i.e. tasks other then interrupt service routines which may be performed by processor 12).

Execution core 40 includes circuitry used to execute instructions according to an instruction set defined for processor 12. Instructions within the instruction set may be defined to have operands within one more registers. Each register set 46A–46H may include each of the registers which may be an operand of an instruction. Accordingly, execution core 40 may access register file 44 to read operands for a particular instruction, and may also update register file 44 with an execution result of a particular instruction. Execution core 40 may comprise a pipelined execution core (in which multiple instructions may be in various stages of execution), a superscalar core (including multiple execution units), or any combination of both.

In addition to determining a register number for each operand corresponding to an instruction, execution core 40 also determines which register set 46A–46H from which to access the register. Task ID register 42 may store a value indicative of the task currently executing. Task IDs may be assigned to each of the interrupt sources (for which a register set is assigned within register file 44). Upon initiation of a particular task, the task ID identifying that task is stored in task ID register 42. Accordingly, execution core 40 uses the value stored in task ID register 42 to select a register set 46A–46H within register file 44, and uses the register number from a particular instruction to select a particular register within that register set.

By dedicating register sets to each possible interrupt source, saving and restoring context may be eliminated. Instead, different register sets are used for each interrupt source as well as for non-interrupt tasks. Non-interrupt tasks, in the current embodiment, use default register set 46H. It is noted that, in an alternative embodiment, one or more interrupt sources may share a particular register set. The interrupt service routines corresponding to the one or more interrupt sources may perform context save and restore operations as needed. For example, external source register set 46G may be shared among one or more external interrupt sources.

Figure 3:
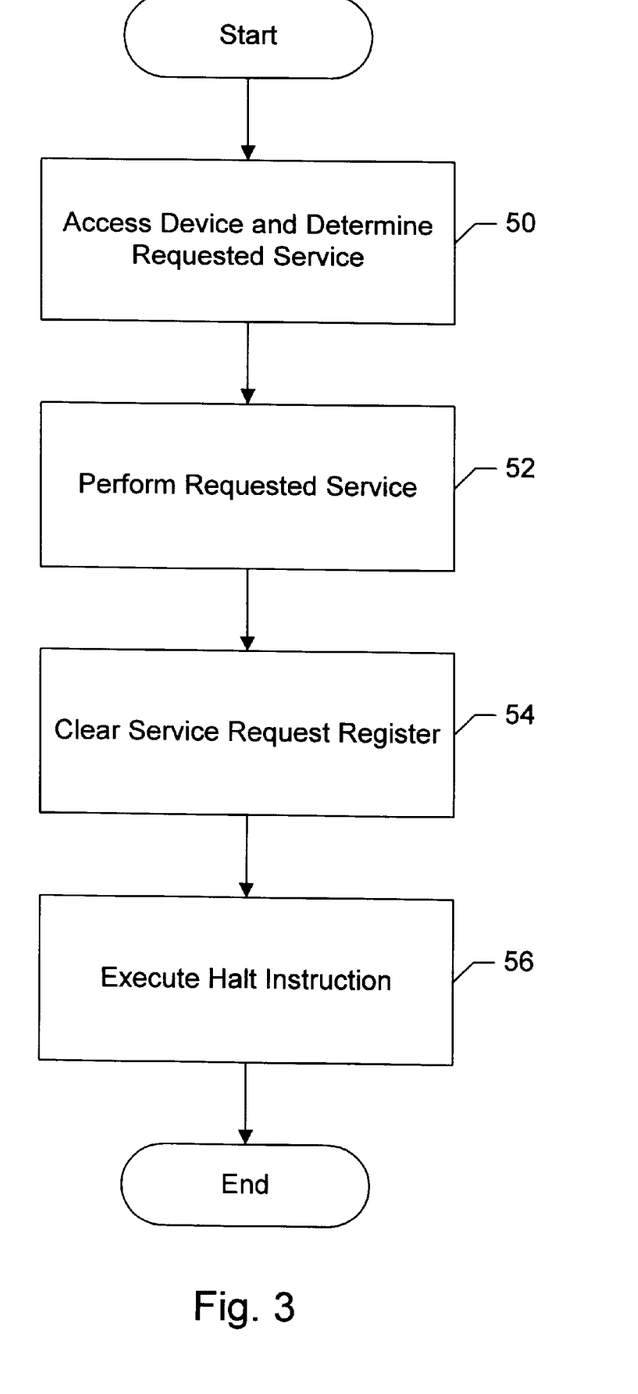
FIG. 3 is a flowchart illustrating the steps included in an exemplary service routine.

Turning next to FIG. 3, a flowchart illustrating exemplary operations performed by a task corresponding to an interrupt source is shown. Other embodiments are possible and contemplated. The operations illustrated in the flowchart are shown in a particular order for ease of understanding. However, any suitable order may be used.

Since the task corresponds to particular interrupt source, the task is coded to access the particular interrupt source. Accordingly, the task accesses be the interrupt source and determines which of one or more possible service requests is active (step 50). As mentioned above, each service request register may be encoded in a fashion suitable for the particular interrupt source. Since the task corresponding to the particular interrupt source is coded specifically for the particular interrupt source, the task is capable of deciphering the encoding. The task then performs the requested service (step 52). The task may then update the service request register to clear the service request corresponding to the service performed by the task (step 54). The task may then be ready to terminate. In the present embodiment, tasks are terminated by a halt instruction (step 56). The halt instruction may be similar, for example, to the halt instruction defined in the x86 instruction set architecture (also referred to as IA-32 or APX). However, instead of stopping execution of processor 12, the halt instruction may invoke a schedule implementation routine which selects the next task to be executed. Generally, the term "halt instruction", as used herein, refers to an instruction which signals the termination of a task.

Generally, the steps shown in FIG. 3 correspond to the steps performed by an interrupt service routine. A task corresponding to an interrupt source may be generated by taking a corresponding interrupt service routine, removing the context saving and restoring portions, and adding the halt instruction described above. As an alternative to the halt instruction, any other method for signalling to processor 12 that the task is complete may be used. For example, if the task is called as a subroutine, a subroutine return instruction may terminate the task.

Figure 4:
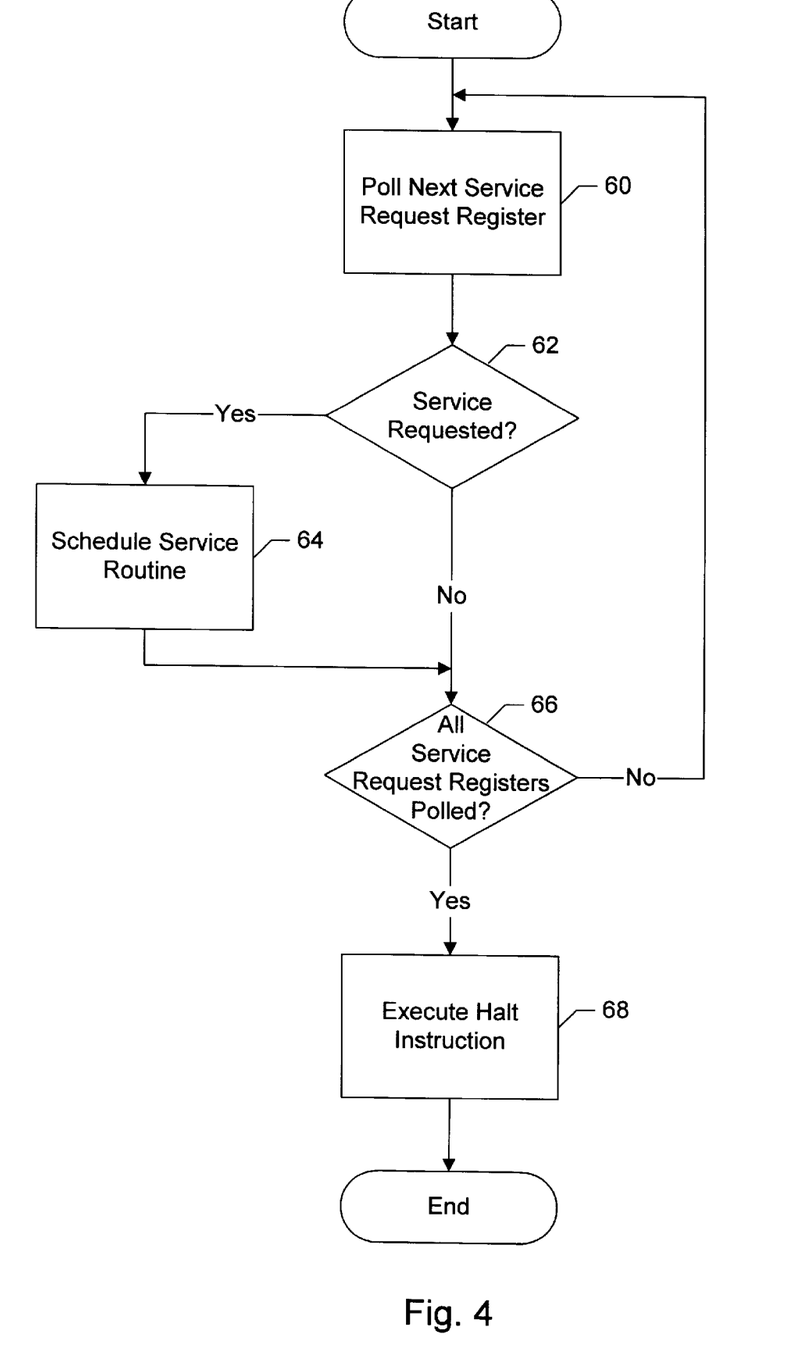
FIG. 4 is a flowchart illustrating an exemplary scheduling task.

Turning now to FIG. 4, a flowchart is shown illustrating an exemplary set of operations performed by a scheduling task. Other embodiments are possible and contemplated. The operations shown in FIG. 4 are illustrated in a particular order for ease of understanding. However, any suitable order may be used.

The scheduling task is used by processor 12 to determine which of the potential interrupt sources is requesting service. The scheduling task may be a default task of processor 12 (i.e. register set 46H may be used by the scheduling task). The scheduling task polls the next service request register 34A–34F according to an order defined by the scheduling task (step 60). The defined order may correspond to a priority scheme amongst the possible interrupt sources. For example, those interrupt sources which are "real-time" in nature (i.e. the interrupt source operates according to real-time as opposed to devices which may operate properly with any latency) may be defined as high priority while non-real-time interrupt sources may be lower priority. For example, video and audio devices are typically real-time devices. Furthermore, high bandwidth devices may be defined to have higher priority than lower bandwidth devices.

The scheduling task examines the value stored in the polled service request register to determine if a service is requested (decision block 62). The scheduling task may determine that service is requested, for example, if the value is non-zero. If service is requested, the corresponding service routine is scheduled (step 64). For example, the scheduling task may maintain a scheduling list of each task which is scheduled execute. Tasks may be removed from the head of the list as they are executed. Whether or not service is requested according to the polled service request register, the scheduling task determines whether not all the service request registers have been polled (decision block 66). If all the service request registers have not been polled, the scheduling task polls the next service request register (step 60). Otherwise, the scheduling task terminates. The scheduling task may, for example, terminate with a halt instruction (step 68).

The scheduling task executes periodically within processor 12. Processor 12 may invoke the scheduling task, for example, at a fixed time interval.

Figure 5:
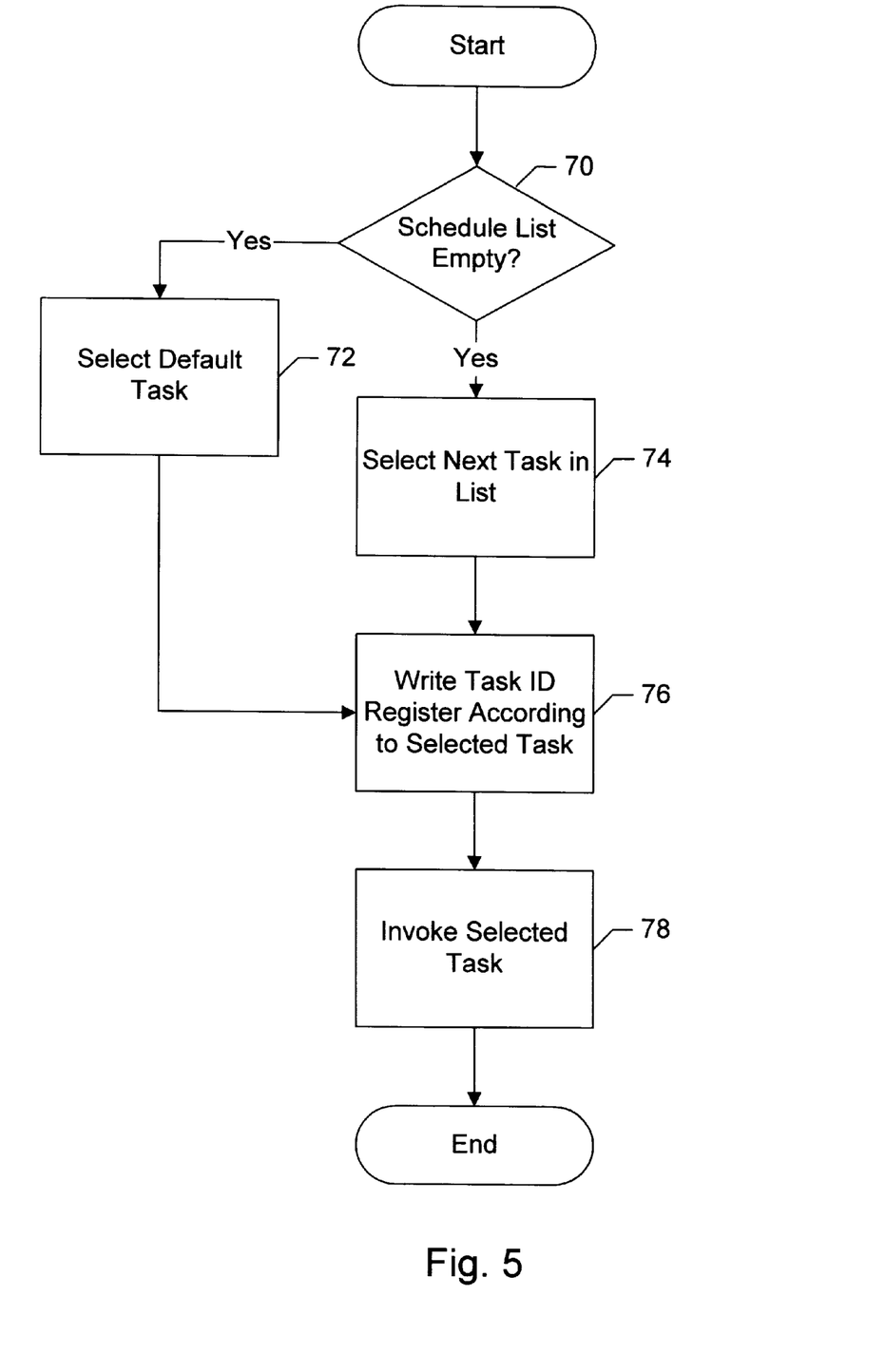
FIG. 5 is a flowchart illustrating an exemplary schedule invocation task.

Turning next to FIG. 5, a flowchart illustrating exemplary steps performed by a schedule implementation task is shown. Other embodiments are possible and contemplated. The operations shown in FIG. 5 are illustrated in a particular order for ease of understanding. However, any suitable order may be used.

The schedule implementation task is invoked when a task terminates (e.g. with a halt instruction). The schedule implementation task examines the schedule list created by the scheduling task to determine the next task to be executed. If the schedule list is empty (decision block 70), the default task is selected (step 72). Otherwise, the next task in the schedule list is selected (step 74). In either case, the task ID corresponding to be selected task is updated into the task ID register (step 76). As mentioned above, different task IDs are assigned to each of the interrupt sources to identify the register set corresponding to that task. Tasks which are not associated with an interrupt source are assigned the default task ID. The selected task is then invoked (step 78).

It is noted that instruction sequences corresponding to tasks illustrated in FIGS. 3, 4, and 5 may be stored in a memory within embedded controller 10 as shown in FIG. 1. For example, one or more of the routines may be stored in RAM 16, flash memory 18, and/or boot RAM 20. Furthermore, the operations shown in FIGS. 4 and/or 5 may alternatively be implemented in hardware within processor 12.

Numerous variations and modifications will become apparent to those skilled in the art once the above disclosure is fully appreciated. It is intended that the following claims be interpreted to embrace all such variations and modifications.

What is claimed is:

1. A processor comprising:

an execution core configured to execute instructions; and a register file coupled to said execution core, said register file divided into a plurality of register sets, wherein one of said plurality of register sets is dedicated to a default task, and wherein each remaining one of said plurality of register sets is dedicated to a different interrupt source.

2. The processor as recited in claim 1 wherein said execution core is configured to poll each interrupt source to determine if a service is requested.

3. The processor as recited in claim 2 wherein said processor is configured to execute a service routine corresponding to said interrupt source if said service is requested.

4. The processor as recited in claim 3 wherein said execution core is configured to access registers within a corresponding one of said plurality of register sets during execution of said service routine, said corresponding one of said plurality of register sets being dedicated to said interrupt source.

5. The processor as recited in claim 3 wherein said execution core is configured to execute a halt instruction at a conclusion of said service routine.

6. The processor as recited in claim 5 wherein said processor is configured to invoke a schedule implementation routine to select a next task to be executed responsive to said halt instruction.

7. The processor as recited in claim 1 further comprising a task ID register coupled to said execution core, wherein said task ID register identifies a currently executing task as said default task or a task corresponding to one of said different interrupt sources.

8. The processor as recited in claim 7 wherein said execution core is configured to use a task ID stored in said task ID register to determine which of said plurality of register sets to access during instruction execution.

9. An embedded controller comprising:

a processor including:
an execution core configured to execute instructions; and
a register file coupled to said execution core, said register file divided into a plurality of register sets, wherein one of said plurality of register sets is dedicated to a default task, and wherein each remaining one of said plurality of register sets is dedicated to a different interrupt source; and one or more of said interrupt sources coupled to said processor.

10. The embedded controller as recited in claim 9 wherein said one or more interrupt sources comprise one or more input/output (I/O) devices.

11. The embedded controller as recited in claim 10 wherein each of said one or more I/O devices comprises a service request register configured to store service request information.

12. The embedded controller as recited in claim 11 wherein said processor is configured to poll said service request register within said one or more I/O devices to determine which of said one or more I/O devices is requesting service.

13. The embedded controller as recited in claim 9 further comprising a memory coupled to said processor, wherein said memory is configured to store one or more service routines, wherein each of said one or more service routines corresponds to a different one of said one or more interrupt sources.

14. The embedded controller as recited in claim 13 wherein said processor is configured to execute said one or more service routines.

15. The embedded controller as recited in claim 14 wherein each of said one or more service routines is terminated by a halt instruction.

16. The embedded controller as recited in claim 15 wherein said processor is configured to select a next task responsive to executing said halt instruction.

17. A method for servicing an interrupt source, the method comprising:

recording a request for service in a service request register;

polling said service request register, thereby detecting said recording; and executing a service routine if said polling detects said request, said executing comprising accessing a set of registers dedicated to said interrupt source.

18. The method as recited in claim 17 wherein said polling comprises scheduling a task corresponding to said interrupt source if said recording is detected.

19. The method as recited in claim 18 further comprising determining that said task is next to execute.

20. The method as recited in claim 19 further comprising updating a task ID register with a value representing said task responsive to determining that said task is next to execute.

21. The method as recited in claim 17 wherein said executing comprises executing a halt instruction at a completion of said service routine.

22. The method as recited in claim 21 further comprising invoking a scheduling routine responsive to said executing said halt instruction.

* * * * *